United States Patent

[11] 3,563,420

[72] Inventor Charles H. Ansley
35 Farview Hill, Rochester, N.Y. 14620
[21] Appl. No. 834,084
[22] Filed June 17, 1969
[45] Patented Feb. 16, 1971

[54] VIBRATORY EVACUATOR
12 Claims, 5 Drawing Figs.
[52] U.S. Cl. .................................................. 222/199
[51] Int. Cl. ................................................... B65g 3/12
[50] Field of Search ........................................ 222/161,
198, 199, 202, 203

[56] References Cited
UNITED STATES PATENTS
2,869,592 1/1959 Krueger ....................... 222/199X
3,193,153 7/1965 Hosokawa ..................... 222/199
3,261,508 7/1966 Wahl ............................. 222/199
3,399,771 9/1968 Hryniowski .................. 222/199X Primary Examiner—Samuel F. Coleman
Attorney—Cumpston, Shaw and Stephens ABSTRACT: A vibratory evacuator has a base with coil springs on which a vibratory element is mounted so that its upper surface is arranged below an outlet for material to be evacuated. The vibratory element includes a motor mounted beneath the upper surface and having a vertical shaft turning an upper eccentric above the motor and a lower eccentric below the motor. The upper eccentric impresses an orbital and generally horizontal vibration on the element, and the lower eccentric impresses successive tilting motions on the element. At least one discharge passageway leads from the upper surface radially outward from the region of the motor for evacuating the material that is fluidized by the vibration motion.

INVENTOR.
CHARLES H. ANSLEY

INVENTOR.
CHARLES H. ANSLEY
BY Cumpston, Shaw & Stephens
ATTORNEYS 3,563,420

VIBRATORY EVACUATOR

THE IMPROVEMENT EFFECTED

Vibratory evacuators for hoppers, bins, pipes, etc. are generally known and ordinarily vibrate in the horizontal plane. Vertical components of such motion are produced by dome or conic surfaces inclined relative to the vibratory motion plane. Such devices have not been successful in evacuating the materials that are most resistant to flow.

The invention involves the discovery that a different vibratory motion has special advantages in vibratory evacuators. The motion in question has been used for years in screen separators, but has never been applied to vibratory evacuators. It is especially capable of delivering high shear forces in the region of the perimeter or sides of the chamber containing the material to be fed so as to dislodge and fluidize even the most reluctant materials. The different vibratory action is also more effective in transmitting fluidizing energy to the material. The invention thus achieves the general object of a more effective and efficient vibratory evacuator.

SUMMARY OF THE INVENTION

In the inventive evacuator, coil springs are mounted on a base, and a vibratory element is mounted on the springs to have its upper surface disposed beneath the outlet of a chamber for material to be evacuated. A motor is mounted on the vibratory element beneath the upper surface and has a vertical shaft for turning eccentrics above and below the motor. At least one discharge passageway is arranged radially outward from the motor. When the motor is energized to rotate both eccentrics simultaneously, the upper eccentric impresses an orbital and generally horizontal vibration on the element, and the lower eccentric impresses successive tilting motions on the element. Such motions cooperate to distribute vibration efficiently and rapidly around the outlet for the chamber, and to concentrate the vertical motions for maximum shear of the material in the region of the chamber walls. The region vertically above the perimeter of the vibratory element is unobstructed so that the tilting vibration is transmitted directly to a substantial depth of material. This helps make the inventive arrangement for mounting and driving the vibratory element very efficient in transmitting vibratory energy to the material in the chamber to loosen it and make it free flowing and fluid.

The upper surface of the vibratory element can be shaped in various ways to agitate the material, and the vibratory element can be flexibly connected to the material chamber or include an entire bin or hopper. Preferably, the eccentrics are individually adjustable to vary the amplitude and relationship to the two vibratory modes.

DRAWINGS

DETAILED DESCRIPTION

Figure 1:
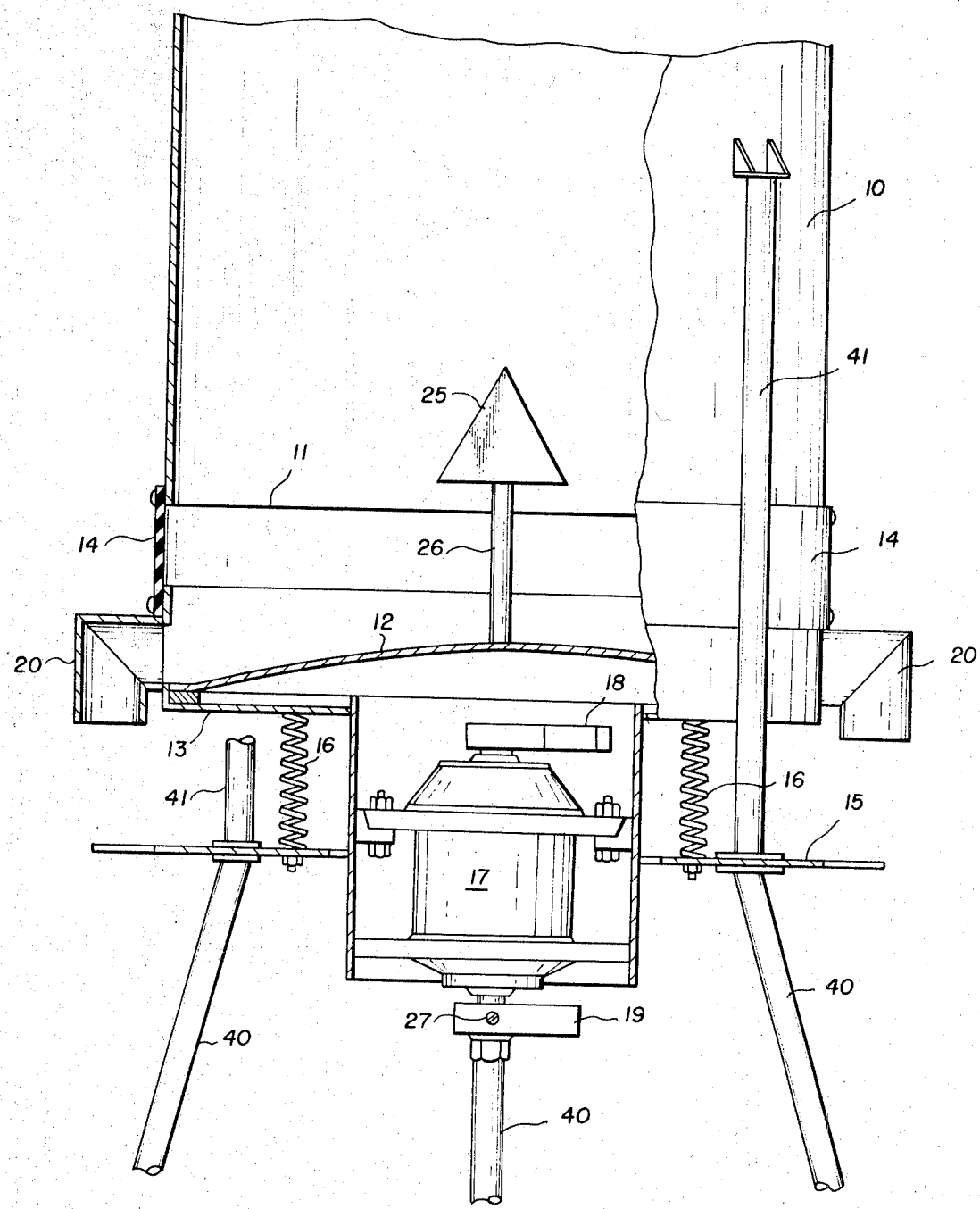
FIG. 1 is a partially cutaway and partially fragmentary elevational view of a preferred embodiment of the inventive vibratory evacuator.

As shown in FIG. 1, a chamber 10 stores material to be fed through an outlet passageway 11 at the bottom of chamber 10. Chamber 10 can be any of a variety of bins, hoppers, pipes, chutes, vehicles, or other storage chambers, and its walls can be vertical, funnel-shaped, or arranged in any desired way.

A preferred embodiment of the inventive evacuator is arranged below outlet 11 for evacuating material contained in chamber 10. Three legs 40 support an annular flange 15 having a circular ring of coil springs 16 mounted around its inner edge. Flange 15 extends radially outward a substantial distance beyond coil springs 16. Vibratory element 13 is mounted on springs 16 for vibrational motion relative to base flange 15 and chamber 10. A flexible sleeve 14 connects vibratory element 13 to chamber 10. Support legs 41 extend upward from base flange 15 to support chamber 10 above vibratory element 13. Hence, base flange 15 serves as a junction between legs 40 supporting the entire device and legs 41 supporting chamber 10 rigidly above base 15, and vibratory element 13 vibrates under chamber 10 within the space between legs 41.

The upper surface 12 of vibratory element 13 is dome-shaped and high in the center, and is preferably circular to extend fully across outlet 11. Outlet spouts or passageways 20 are formed at the perimeter of element 13 and communicate with upper surface 12 for directing discharged material out of the evacuator.

A motor 17 is supported by element 13 beneath upper surface 12, and motor 17 is oriented so that its rotating shaft is vertical. Motor 17 turns an upper eccentric 18 and a lower eccentric 19, each of which are secured to the shaft of motor 17 for turning simultaneously when motor 17 is energized.

Figure 3:
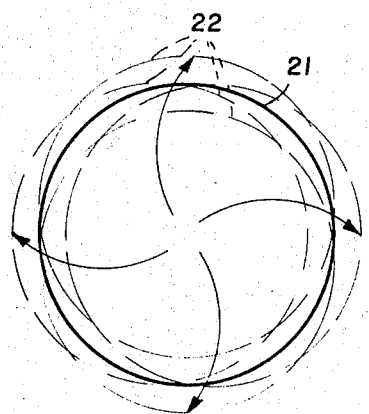
FIGS. 3 and 4 are schematic illustrations of the vibrational modes of the inventive evacuator.

Upper eccentric 18 is preferably arranged near the center of mass of vibratory element 13 to drive surface 12 in an orbital motion in a generally horizontal plane as schematically represented by FIG. 3. Circle 21 represents the central rest position of surface 12, and eccentric circles 22 represent a few of the infinite number of positions of surface 12 in its orbital motion. Such orbital motion is preferably relatively fast and tends to drive material radially outward as schematically represented by the arrows in FIG. 3.

Figure 4:
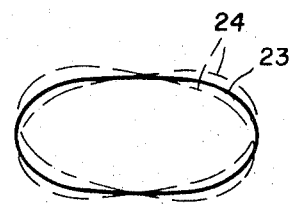

Bottom eccentric 19 is vertically below the center of mass of vibratory element 13, and it drives surface 12 in tilting motions relative to the horizontal such as schematically shown in FIG. 4. Ellipse 23 represents a normally assumed horizontal rest position for surface 12, and ellipses 24 represent two of an infinite number of tilt positions through which surface 12 passes in the motion imposed by lower eccentric 19.

Eccentrics 18 and 19 can be varied in mass by substituting heavier or lighter bodies to change the amplitude of each vibrational mode. Making eccentric 18 heavier tends to increase the eccentricity of the orbital path in the horizontal plane, and increasing the mass of eccentric 19 tends to increase the angle of tilt from the horizontal. Also, at least one of the eccentrics 18 and 19 is preferably angularly adjustable on the shaft of motor 17 for varying the angular relation between the two eccentrics. Such angular adjustment modifies the flow tendencies across surface 12, and different adjustments provide optimum vibration for different types of materials. Set screws 27 or the like can accomplish such angular adjustment, and for many materials an angle from 0° to 90° between eccentrics 18 and 19 is preferred.

The orbital vibrational mode impressed on element 13 by eccentric 18 cooperates with the tilting vibrational mode impressed on element 13 by eccentric 19 to produce vertical components of tilting motion that course rapidly around the entire periphery of surface 12 as it vibrates under outlet 11. The space above the perimeter of surface 12 is unobstructed so that such motion is transmitted directly to a substantial depth of material. The result is concentrated shear forces around the perimeter of surface 12, flexible sleeve 14, and the walls of chamber 10 for optimum loosening and fluidizing of material to be evacuated.

A conical-shaped agitator 25 is mounted on a rod 26 extending rigidly above surface 12 to move with surface 12. Agitator 25 helps to loosen material in the center of chamber 10. Agitator 25 can have many shapes, and several agitators can be used, depending upon the material in chamber 10. Also, for many applications agitator 25 can be omitted entirely.

Figure 2:
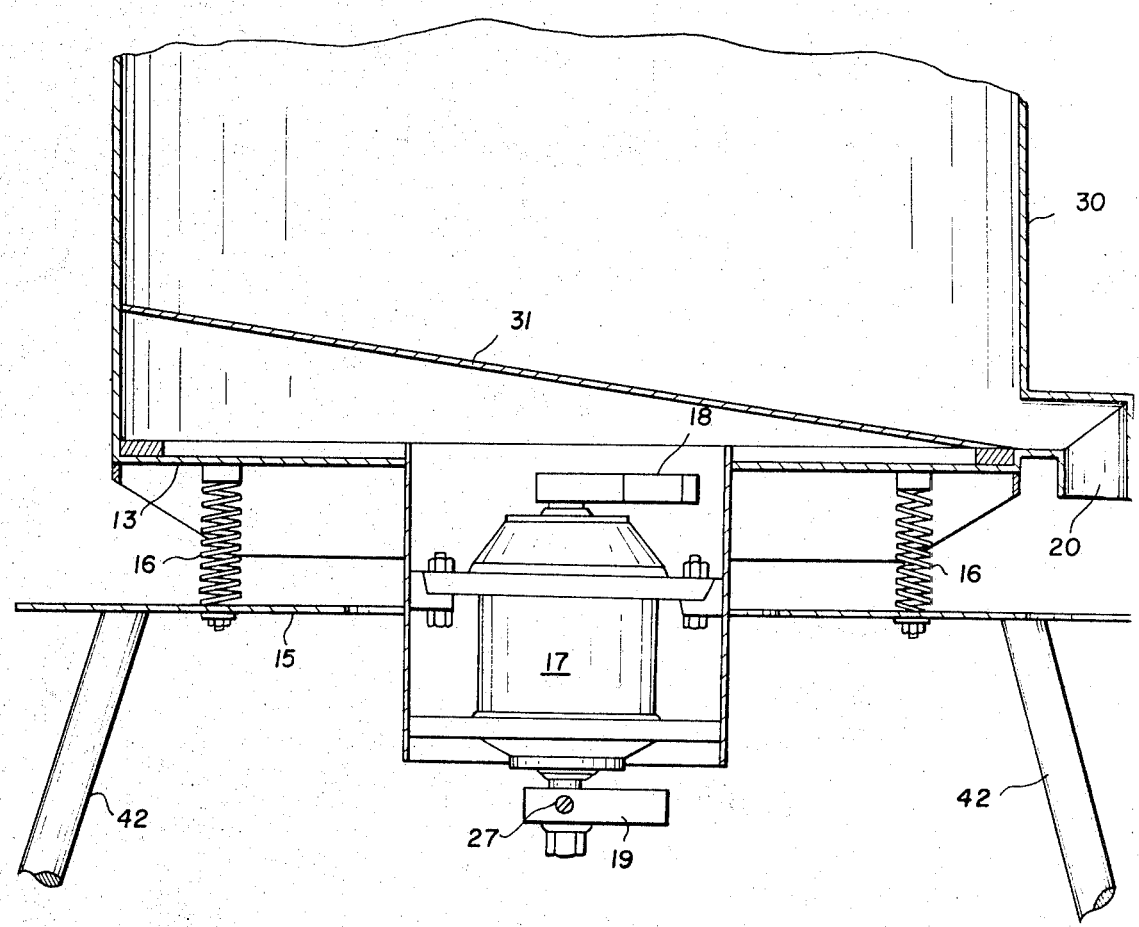
FIG. 2 is a cross-sectional view of an alternative preferred embodiment of the inventive evacuator.

An alternative version of the inventive evacuator as shown in FIG. 2 is similar to the evacuator of FIG. 1. Vibrating upper surface 31 is sloped downward toward a peripheral outlet spout 20 extending from an opening in chamber wall 30. The slope of surface 31 biases the flow of material toward spout 20. Legs 42 support annular base flange 15, and vibratory element 13, which is supported on springs 16 above base flange 15, includes and is integral with chamber 30 so that the entire chamber 30 vibrates with surface 31. Preferably, the same double-mode vibration is imparted to surface 31 by motor 17 and eccentrics 18 and 19 as described above relative to FIG. 1.

Figure 5:
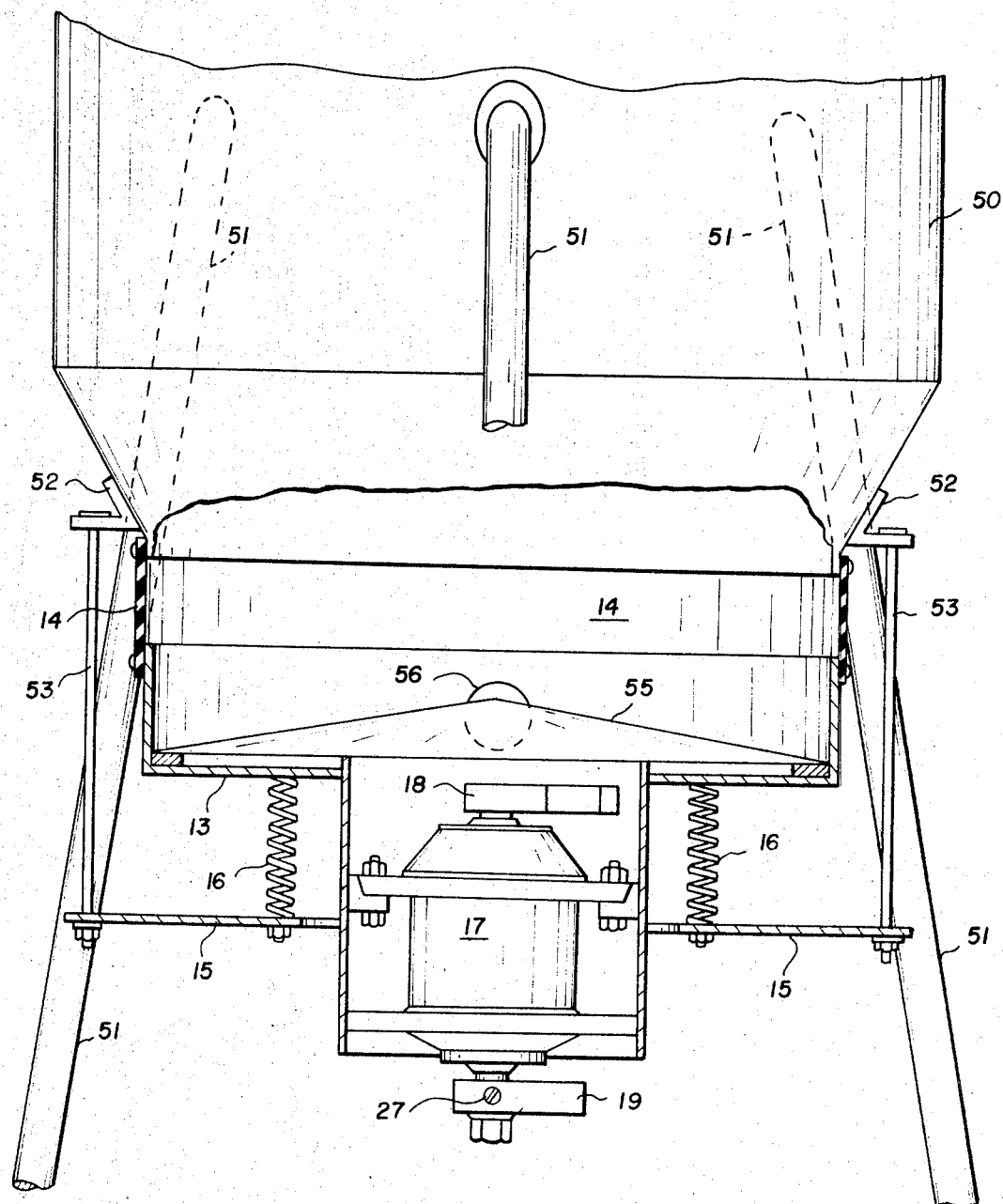
FIG. 5 is a partially cutaway and partially fragmentary elevational view of an alternative preferred embodiment of the inventive vibratory evacuator.

Another preferred embodiment of the inventive evacuator is illustrated in FIG. 5. Chamber 50 is relatively large and independently upheld by support legs 51. Rods 53 are connected to brackets 52 on chamber 50 and to the outer region of base flange 15 so that vibratory element 13 is dependently supported on springs 16 beneath chamber 51. A flexible sleeve 14 connects vibratory element 13 to chamber 50. The upper surface 55 of vibratory element 13 is slightly conical and high in the center. At least one outlet passageway 56 is arranged at the perimeter of upper surface 55 for directing discharged material out of the evacuator.

Discharge spouts from the inventive evacuator can be formed in a variety of ways. Single or multiple discharge passageways can be used, and they can be located in any position radially outward of motor 17 away from the center of vibratory element 13. Even the perimeter of vibratory element 13 can be completely open for discharge of material all the way around the evacuator.

Persons wishing to practice the invention should remember that other embodiments and variations can be adapted to particular circumstances. Even though one point of view is necessarily chosen in describing and defining the invention, this should not inhibit broader or related applications within the spirit of the invention. For example, a variety of agitators or projections can be mounted above the vibrating surface to help loosen and guide material. Also, the vibrating surface can have many different configurations depending on the material to be fed, and the evacuator can be supported in many ways. Furthermore, bins or hoppers can be supported in many different ways and discharge spouts can have a variety of shapes including oval or rectangular cross sections.

I claim:
1. A vibratory evacuator comprising:
   a. a fixed storage chamber for holding a large quantity of non-free-flowing material;
   b. said chamber having a bottom outlet for said material;
   c. a base supported under said quantity of material;
   d. coil springs mounted on said base;
   e. a vibratory element mounted on said springs;
   f. said vibratory element having an upper surface;
   g. a vertically oriented, rotatable shaft mounted on said vibratory element beneath said upper surface;
   h. an upper eccentric secured to an upper region of said shaft to impress an orbital and generally horizontal vibration on said upper surface;
   i. a lower eccentric secured to a lower region of said shaft to impress tilting vibrations on said upper surface;
   j. said upper surface being arranged at the bottom of said quantity of material in substantial registry with said outlet to vibrationally evacuate said material from said chamber;
   k. a discharge region for said material moving from said upper surface, said discharge region being radially outward from the region of said shaft;
   l. the space in said chamber vertically above the peripheral region of said upper surface being substantially unobstructed so that said tilting vibration of said upper surface is transmitted directly to a substantial depth of said material in said space; and
   m. means for rotating said shaft to turn said eccentrics simultaneously to drive said upper surface in both of said motions.

2. The evacuator of claim 1 wherein said upper surface is generally dome-shaped with a high center.

3. The evacuator of claim 1 wherein said upper surface is generally conical with a high center.

4. The evacuator of claim 1 including an agitator extending above said upper surface and moving with said upper surface.

5. The evacuator of claim 1 including a flexible sleeve connecting said chamber and a peripheral portion of said vibratory element.

6. The evacuator of claim 1 wherein said upper surface is generally sloped downward from the horizontal toward said discharge region.

7. The evacuator of claim 1 wherein said discharge region comprises a spout extending outward from the peripheral edge of said upper surface.

8. The evacuator of claim 7 including a plurality of said discharge spouts angularly spaced around said periphery of said upper surface.

9. The evacuator of claim 1 wherein at least one of said eccentrics is angularly adjustable on said shaft.

10. The evacuator of claim 1 including legs supporting said base and said chamber, and a flexible sleeve connecting said chamber and a peripheral portion of said vibratory element.

11. The evacuator of claim 1 including means secured to said chamber for supporting said vibratory element under said quantity of material.

12. A method of evacuating a non-free-flowing material from a fixed storage chamber having a bottom outlet through which said material does not normally flow, said method comprising:
   a. arranging a vibratory surface in the region of said outlet so that a substantial and unobstructed depth of said material is not flowing;
   b. providing an open discharge region for said material passing through said outlet to flow off said vibratory surface;
   c. moving said vibratory surface simultaneously in two vibrational modes when flow of said material is desired from said chamber through said discharge region;
   d. one of said vibrational modes comprising an orbital and generally horizontal vibration of said surface; and
   e. the other of said vibrational modes comprising tilting vibrations of said surface to transmit shear forces directly to said substantial depth of said material above the periphery of said vibratory surface.